(12) United States Patent
Mantri et al.

(10) Patent No.: US 11,423,584 B2
(45) Date of Patent: Aug. 23, 2022

(54) SYSTEMS AND METHODS FOR DYNAMICALLY ESTIMATING REAL TIME SIGNAL STRENGTHS FOR A WIRELESS ROUTER USING AUGMENTED REALITY

(71) Applicant: Verizon Patent and Licensing Inc., Basking Ridge, NJ (US)

(72) Inventors: Viraj Chandrakant Mantri, Mumbai (IN); Srividhya Parthasarathy, Chennai (IN); Ramasubramanian Radhakkrishnan, Chennai (IN); Nandhini Rajendran, Vellore (IN); Abhishek Malhotra, Hyderabad (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/102,763

(22) Filed: Nov. 24, 2020

(65) Prior Publication Data

US 2022/0164997 A1    May 26, 2022

(51) Int. Cl.
*G06T 11/00*    (2006.01)
*G06T 7/70*    (2017.01)
*H04W 24/08*    (2009.01)
*H04B 17/318*    (2015.01)

(52) U.S. Cl.
CPC .............. *G06T 11/00* (2013.01); *G06T 7/70* (2017.01); *H04B 17/318* (2015.01); *H04W 24/08* (2013.01)

(58) Field of Classification Search
CPC ......... G06T 11/00; G06T 7/70; H04B 17/318; H04W 24/08
See application file for complete search history.

(56) References Cited

U.S. PATENT DOCUMENTS 9,942,872 B1 * 4/2018 Mossey ................ G01S 5/0252
2017/0243400 A1 * 8/2017 Skidmore ............. G06T 19/006

OTHER PUBLICATIONS

Ouyang et al., High-Performance Temporal Object-Tracking Algorithm Using Virtual Targets in Wireless Sensor Networks, 2011 Seventh International Conference on Mobile Ad-hoc and Sensor Networks, pp. 403-407. (Year: 2011).*

* cited by examiner

*Primary Examiner* — Samantha (Yuehan) Wang

(57) ABSTRACT

A user device may receive an image of an area receiving signals from a wireless router; determine a received signal strength indicator (RSSI) based on a signal from the wireless router; determine an initial virtual point in the image; calculate geographical coordinates of the initial virtual point; calculate a signal strength of the wireless router at the geographical coordinates and based on the RSSI; provide for display an augmented reality indication of the signal strength in the image and at the initial virtual point; receive inputs indicating movements of the initial virtual point to new virtual points in the image; calculate new geographical coordinates of the new virtual points; calculate new signal strengths of the wireless router at the new geographical coordinates and based on the RSSI; and provide for display augmented reality indications of the new signal strengths in the image and at the new virtual points.

20 Claims, 9 Drawing Sheets

SYSTEMS AND METHODS FOR DYNAMICALLY ESTIMATING REAL TIME SIGNAL STRENGTHS FOR A WIRELESS ROUTER USING AUGMENTED REALITY

BACKGROUND

Extended reality (XR), such as augmented reality (AR), virtual reality (VR), mixed reality (MR), and/or the like, may refer to computer technologies that use software to integrate real and virtual elements and/or audio to create an immersive experience. For example, AR generally refers to interactive technologies in which objects in a real-world environment are augmented using computer-generated virtual content that may be overlaid on the real-world environment.

DETAILED DESCRIPTION OF PREFERRED EMBODIMENTS

Figure 1A:
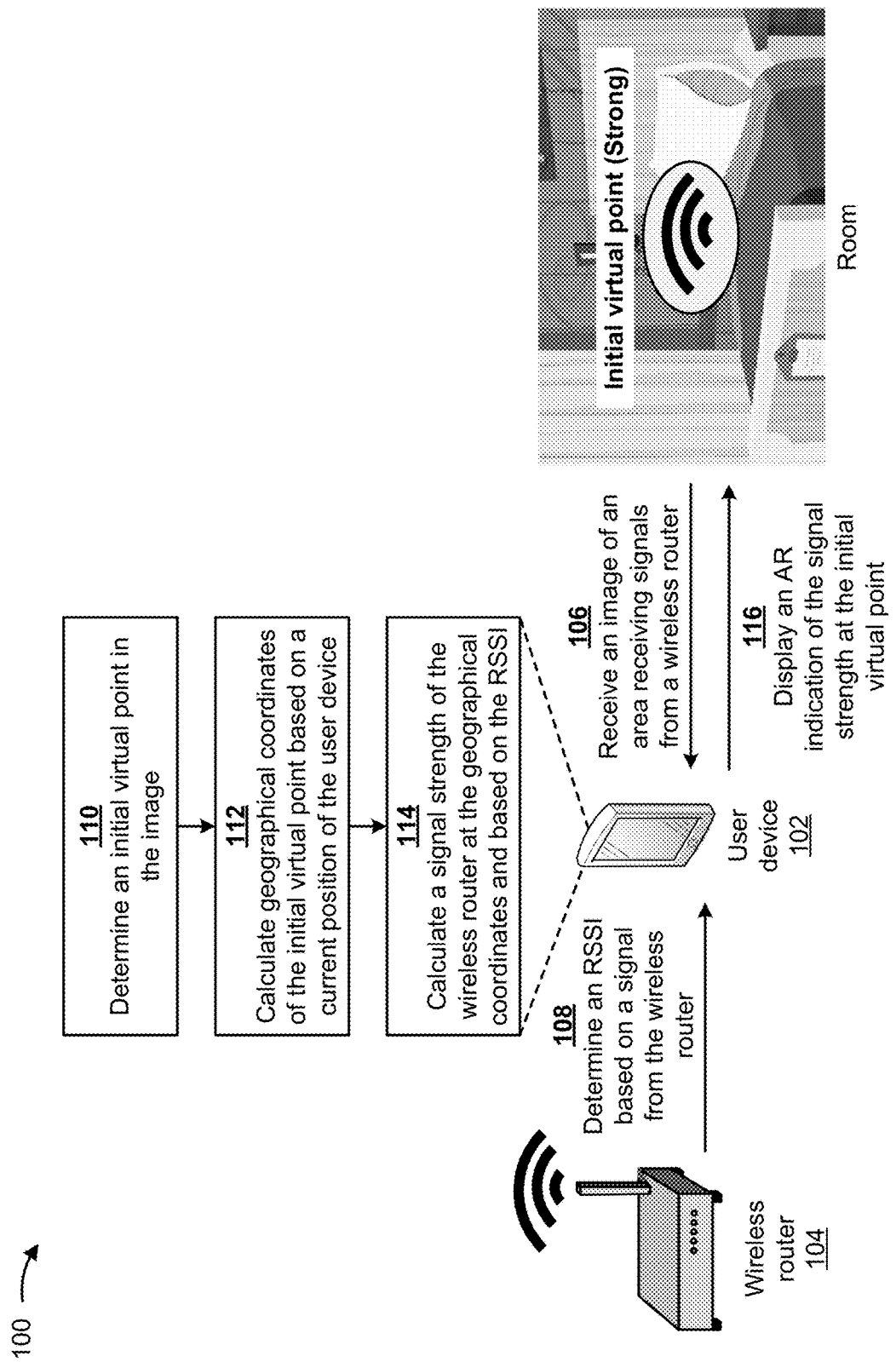
FIGS. 1A-1F are diagrams of one or more examples associated with dynamically estimating real time signal strengths for a wireless router using augmented reality.

The following detailed description of example implementations refers to the accompanying drawings. The same reference numbers in different drawings may identify the same or similar elements.

A user device and a wireless router may be located at a customer premises. The user device may connect through a wireless network (e.g., a WiFi network) with the wireless router and may receive signals from wireless router. A signal strength of the wireless router may vary from one area of the customer premises to another area of the customer premises and, sometimes, from one location to another location within the same area. Different types of obstruction (e.g., an object, a physical structure such as a wall, and/or a magnetic interference) may affect the signal strength.

A user may desire a particular signal strength (of the wireless router) in each area, of the customer premises, in which the user may be located with the user device. Additionally, or alternatively, the user may desire to determine a signal strength (of the wireless router) in each area, of the customer premises, in which the user may be located with the user device. In this regard, the user may physically move the wireless router from a first area (in which the user is located with the user device) to a second area (in which the user is subsequently located with the user device), and so on. The process of physically moving the wireless router to different locations can be tedious and time consuming.

Additionally, each time the wireless router is moved from one location to another location, the wireless router may be caused to reboot and reconnect to devices located in the customer premises and/or to an external network (e.g., the Internet).

Some implementations described herein enable a user device to determine a signal strength of a wireless router, as if the wireless router were physically located at different locations (e.g., rooms, floors, areas) of a customer premises, using augmented reality. The signal strength may be determined without actually moving the wireless router to the different locations.

For example, the user device may receive an image of an area receiving signals from a wireless router; determine a received signal strength indicator based on a signal from the wireless router; determine an initial virtual point in the image based on a current position of the user device; calculate geographical coordinates of the initial virtual point; calculate a signal strength of the wireless router at the geographical coordinates and based on the received signal strength indicator; and provide for display an augmented reality indication of the signal strength in the image and at the initial virtual point.

The user device may receive multiple inputs indicating multiple movements of the initial virtual point to multiple new virtual points in the image; calculate multiple new geographical coordinates of the multiple new virtual points; calculate multiple new signal strengths of the wireless router at the multiple new geographical coordinates and based on the received signal strength indicator; and provide for display multiple augmented reality indications of the multiple new signal strengths in the image and at the multiple new virtual points.

By enabling the user device to determine a signal strength of the wireless router in different areas without physically moving the wireless router to the different areas and to display an AR indication of the signal strength, some implementations described herein may preserve storage resources, network resources, and computer resources that would have otherwise been used to reboot and or optimize the wireless router location.

FIGS. 1A-1F are diagrams of one or more examples 100 associated with dynamically estimating real time signal strengths for a wireless router using augmented reality. As shown in FIGS. 1A-1F, example(s) 100 may include a user device 102 and a wireless router 104. User device 102 and wireless router 104 are described in more detail in connection with FIG. 2. In some implementations, user device 102 and wireless router 104 may be located at a customer premises of a user of user device 102. The customer premises may include a home, an office, a retail location, an indoor space an outdoor space and/or another location. User device 102 may include a signal strength application to enable user device 102 to determine a signal strength of wireless router 104 at various locations of the customer premises and provide an augmented reality (AR) experience relating to the signal strength.

Figure 1B:
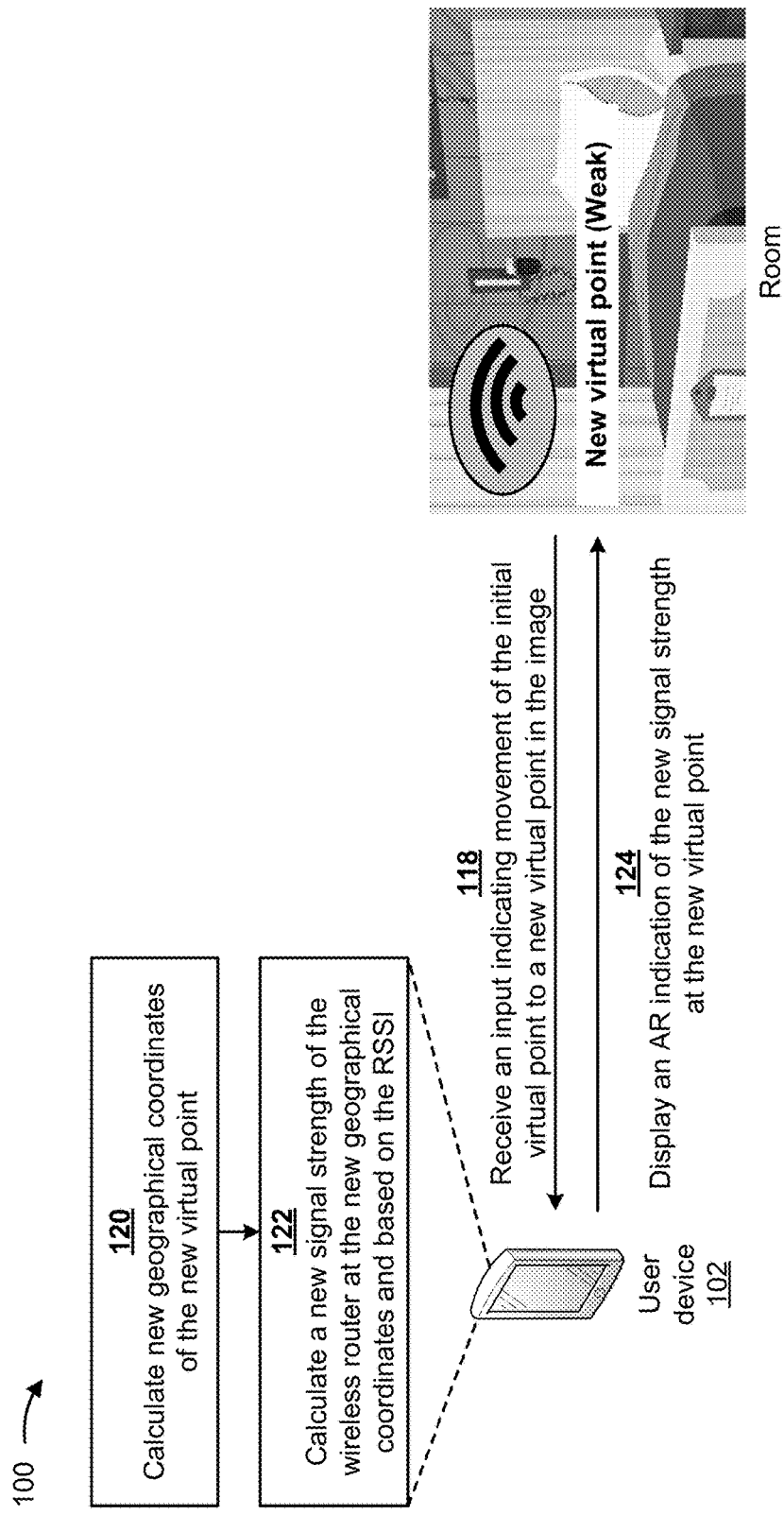
Figure 1C:
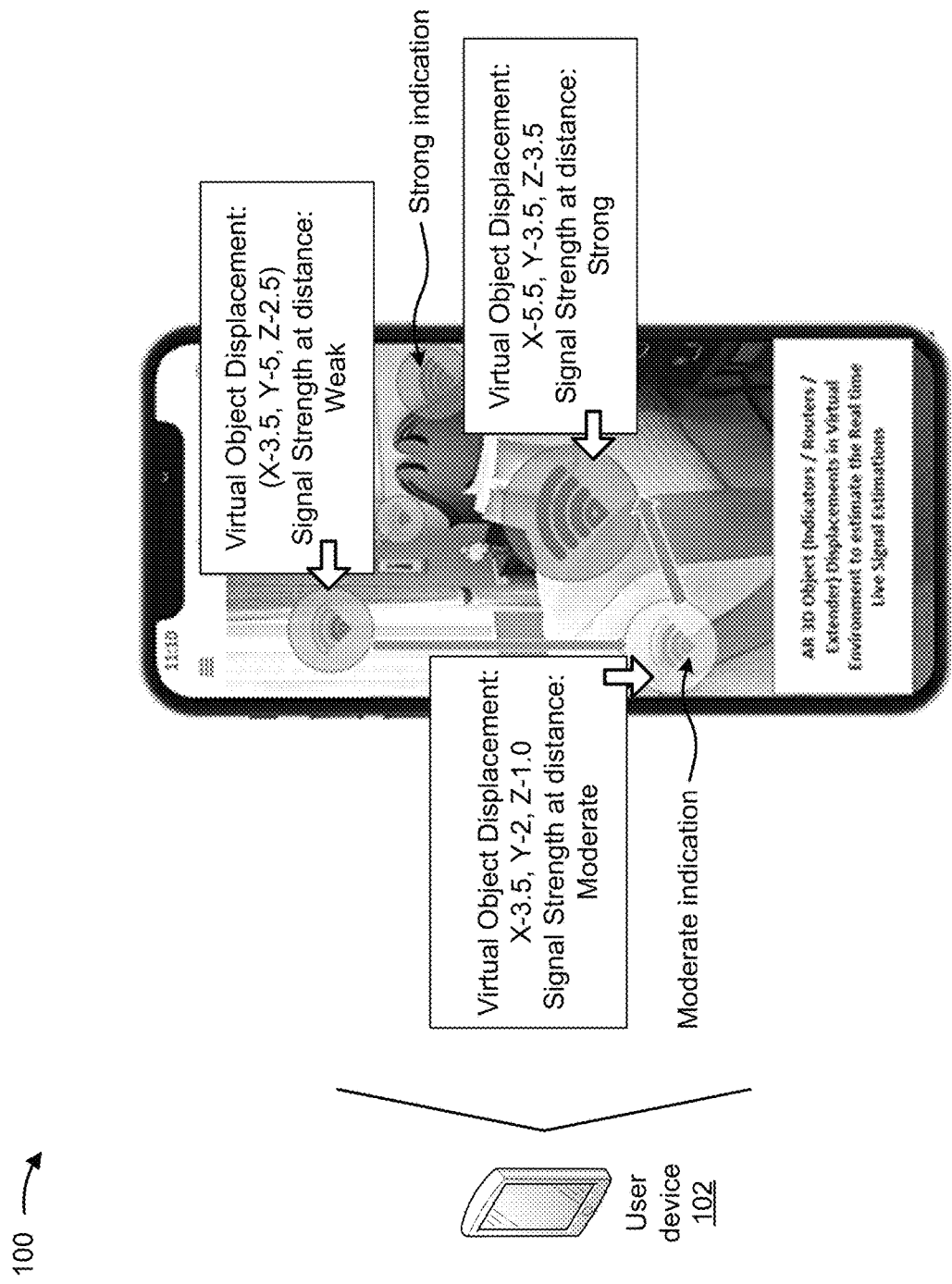

With respect to FIGS. 1A-1C, assume that the user of user device 102 desires to know the signal strength of wireless router 104 at different areas of the customer premises.

As shown in FIG. 1A, and by reference number 106, user device 102 may receive an image of an area (e.g., a room, a floor, or other location) receiving signals from a wireless router. For example, user device 102 may receive a router signal strength request, from the user of user device 102, to initiate a signal strength application to determine the signal strength of wireless router 104 at different locations of the customer premises (e.g., different areas of the customer premises).

Based on receiving the router signal strength request, user device 102 may initiate the signal strength application. The signal strength application may initiate a camera application of user device 102. Assume that the user is located near the area and that user device 102 is pointed in the direction of the area. The signal strength application may cause the camera application to obtain (e.g., using a camera of user device 102) the image of the area and cause the image of the area to be provided for display in a camera view of a display of user device 102. User device 102, the camera application, and the camera may be configured to provide an AR experience to the user.

As shown in FIG. 1A, and by reference number 108, user device 102 determine a received signal strength indicator (RSSI) based on a signal from the wireless router. In some implementations, based on the router signal strength request, the signal strength application may prompt the user to select information identifying wireless router 104 (out of information identifying a plurality of wireless routers) and cause user device 102 to connect to wireless router 104 (if user device 102 is not connected to wireless router 104 at the time of the router signal strength request).

In some implementations, based on the router signal strength request, the signal strength application may cause user device 102 to transmit a RSSI request to wireless router 104. Based on the RSSI request, wireless router 104 may transmit a signal to user device 102 and user device 102 may determine an RSSI value based on the signal. Alternatively, wireless router 104 may transmit a signal to user device 102 periodically (e.g., every five seconds, every thirty seconds, every minute, etc.) and user device 102 may determine the RSSI value based on the signal. The RSSI value may represent an estimated measure of power level that user device 102 is receiving from wireless router 104.

As shown in FIG. 1A, and by reference number 110, user device 102 may determine an initial virtual point in the image. For example, based on the router signal strength request, the signal strength application may cause user device 102 to prompt the user to identify an initial virtual point in the image in the camera view (of the camera) provided on the display of user device 102.

Based on the prompt, the user may interact with the display to identify (or select) a location in the image as the initial virtual point. In some examples, the user may identify a location in the area (e.g., a location of a bed in the area). Accordingly, the initial virtual point may correspond to the location in the area. Alternatively, the user may identify the area. Accordingly, the initial virtual point may corresponding to an entirety of the area.

As shown in FIG. 1A, and by reference number 112, user device 102 may calculate geographical coordinates (e.g., a combination of a latitudinal coordinate, a longitudinal coordinate, and/or an elevation) of the initial virtual point based on a current position of user device 102. For example, the signal strength application may cause user device 102 to determine the geographical coordinates of the initial virtual point based on the current position of user device 102.

In this regard, user device 102 may determine the current position of user device 102. For example, user device 102 may determine the current position of user device 102 using one or more sensor devices of user device 102. The one or more sensors may include an accelerometer, a gyroscope, a magnetometer, an altimeter, a global positioning system (GPS) sensor device, and/or another device that may be used to determine the current position of user device 102.

Use device 102 may use sensor data, obtained from the one or more sensor devices, to determine the current position of user device 102. In some implementations, based on the sensor data, user device 102 may determine geographical coordinates of user device 102 (e.g., (x, y, z) geographical coordinates of user device 102) corresponding to the current position.

User device 102 may determine geographical coordinates of the initial virtual point. For example, user device 102 may process the image and information identifying the initial virtual point using one or more image analysis techniques in combination with the sensor data to determine a location of the initial virtual point with respect to the current position of user device 102. For instance, user device 102 may use three dimensional data modeling (e.g., using the image, the information identifying the initial virtual point, and the sensor data) to determine the location of the initial virtual point with respect to the current position.

User device 102 may use information identifying the location of the initial virtual point and the geographical coordinates of user device 102 to determine the geographical coordinates of the initial virtual point (e.g., (x, y, z) geographical coordinates of the initial virtual point). For example, the location of the initial virtual point may correspond to an offset of the current location of user device 102. Accordingly, user device 102 may determine the geographical coordinates of the initial virtual point as an offset of the geographical coordinates of user device 102 corresponding to the offset of the current location of user device 102.

As shown in FIG. 1A, and by reference number 114, user device 102 may calculate a signal strength of the wireless router at the geographical coordinates of the initial virtual point and based on the RSSI value. For example, based on determining the geographical coordinates of the initial virtual point, the signal strength application may cause user device 102 to calculate the signal strength of wireless router 104 at the geographical coordinates of the initial virtual point.

User device 102 may determine a distance between the current position of user device 102 and the initial virtual point. For example, user device 102 may determine a distance between the geographical coordinates of the current position and the geographical coordinates of the initial virtual point to determine the distance between the current position of user device 102 and the initial virtual point.

User device 102 may determine the signal strength of wireless router 104 at the geographical coordinates of the initial virtual point based on the RSSI value at the current position of user device 102 (e.g., received from wireless router 104) and based on the distance between the current position of user device 102 and the initial virtual point. In some implementations, user device 102 may determine the signal strength of wireless router 104 at the geographical coordinates of the initial virtual point based on the following formula:

$$\text{Distance} = 10^{((\text{Measured Power} - \text{VP RSSI})/(10*N))},$$

where Distance is the distance between the current position of user device 102 and the initial virtual point, Measured Power is an RSSI value at a particular distance from wireless router 104 (e.g., one meter (1 m) from wireless router 104), VP RSSI (or initial virtual point (VP) RSSI) is the RSSI at the geographical coordinates of the initial virtual point, and N is a constant that may depend on environmental factors (e.g., an object, a physical structure such as a wall, a magnetic interference, and/or another obstruction that may affect the signal strength). For example, N may have a value (e.g., between 2 and 4) that is based on the environmental factors, in some implementations.

User device 102 may use the above formula to determine a value of VP RSSI and may determine the signal strength of wireless router 104 (at the geographical coordinates of the initial virtual point) based on the value of VP RSSI.

In some implementations, user device 102 may determine Measured Power based the RSSI value at the current position of user device 102 (e.g., the RSSI value determined above in connection with reference number 108). For example, the RSSI value, determined by user device 102, may correspond to an RSSI value at a distance corresponding to a distance between wireless router 104 and user device 102. User device 102 may determine the distance between wireless router 104 and user device 102. Based on the RSSI value and the distance between wireless router 104 and user device 102, user device 102 may determine Measured Power (e.g., the value of an RSSI one meter (1 m) from wireless router 104).

Alternatively, based on the RSSI request, wireless router 104 may transmit information identifying Measured Power to user device 102. In some implementations, user device 102 may determine the RSSI at the geographical coordinates of the initial virtual point based on a distance between wireless router 104 and the initial virtual point (instead of the distance between the current position of user device 102 and the initial virtual point). User device 102 may determine the distance between wireless router 104 and the initial virtual point based on the distance between wireless router 104 and user device 102 and based on the distance between user device 102 and the initial virtual point.

As shown in FIG. 1A, and by reference number 116, user device 102 may display an AR indication of the signal strength at the initial virtual point. For example, based on determining the signal strength of wireless router 104 at the initial virtual point, the signal strength application may cause user device 102 to generate a graphical representation of the signal strength (e.g., an AR indication of the signal strength at the initial virtual point) and cause that graphical representation to overlay on the image of the area at the location of the initial virtual point.

In some implementations, the signal strength application may cause user device 102 to classify the signal strength of the wireless router based on signal strength thresholds. The signal strength thresholds may include a first threshold and a second threshold that exceeds the first threshold. For example, user device 102 may compare the signal strength and the signal strength thresholds. Based on the comparisons, user device 102 may classify the signal strength as weak if the signal strength does not satisfy the first threshold, classify the signal strength as moderate if the signal strength satisfies the first threshold but does not satisfy the second threshold, and classify the signal strength as strong if the signal strength satisfies the second threshold.

User device 102 may generate the graphical representation based on classifying the signal strength. In some implementations, the graphical representation may be in the shape of one or more arcs, one or more bars, and/or any other graphical information that may represent a wireless signal. In some implementations, the signal strength (or the classification of the signal strength) may be represented by a color, a number, a graphical pattern, and/or other graphical information that may represent a signal strength of a wireless router (or the classification of the signal strength). For example, the signal strength may be represented by a first color if the signal strength is classified as weak (e.g., red), a second color if the signal strength is classified as moderate (e.g., yellow or orange), and a third color if the signal strength is classified as strong (e.g., green).

The signal strength application may cause user device 102 to augment a camera view (of the camera of user device 102) with the graphical representation of the signal strength to provide an augmented reality (AR) experience. For example, user device 102 may render the graphical representation of the signal strength in association with the image (of the area) that is presented on the display. User device 102 may render the graphical representation in such manner to provide an AR experience relating to the signal strength in the area in real time (or near real time). For instance, user device 102 may provide the graphical representation of the signal strength at the initial virtual point. In some implementations, user device 102 may provide the graphical representation with information identifying the classification of the signal strength (e.g., weak, moderate, or strong).

In some implementations, the signal strength application may provide an option to store (e.g., in a memory associated with user device 102) information regarding the graphical representation. The information regarding the graphical representation may be stored to enable user device 102 to provide the graphical representation on demand (e.g., based on a request from the user).

The information regarding the graphical representation may include the information identifying the classification of the signal strength, information identifying the location of the initial virtual point, information identifying the geographical coordinates of the initial virtual point, information identifying the current location of user device 102, and/or information identifying the geographical coordinates of user device 102 at the current location.

As shown in FIG. 1B, and by reference number 118, user device 102 may receive an input indicating movement of the initial virtual point to a new virtual point in the image. For example, user device 102 may detect a pan movement, of the camera of user device 102, indicating movement of the initial virtual point to the new virtual point in the image. In some implementations, user device 102 may detect (e.g., based on the user interacting with the display) movement of the graphical representation of the initial virtual point from the initial virtual point to a different location in the image (as the new virtual point). Alternatively, user device 102 may detect (e.g., based on the user interacting with the display) selection of a different location in the image (as the new virtual point).

The new virtual point may correspond to a different location in the area (e.g., a window of the area as opposed to the bed of the area, as discussed in connection with reference number 110 of FIG. 1A). Alternatively, the new virtual point may correspond to another area in the customer premises or a location in the other area.

As shown in FIG. 1B, and by reference number 120, user device 102 may calculate new geographical coordinates of the new virtual point. In some implementations, user device 102 may calculate the new geographical coordinates of the new virtual point in a manner similar to the manner described above in connection with reference number 112 of FIG. 1A. For instance, user device 102 may determine the location of the new virtual point with respect to the location of the initial virtual point (e.g., based on the information identifying the location of the initial virtual point). Alternatively, user device 102 may determine the location of the new virtual point with respect to the current location of user device 102 (e.g., based on the information identifying the current location of user device 102).

User device 102 may use information identifying the location of the new virtual point and the information identifying the geographical coordinates of the initial virtual point to determine the new geographical coordinates of the new virtual point (e.g., (x, y, z) geographical coordinates of the new virtual point) in a manner similar to the manner described above in connection with reference number 112 of FIG. 1A. Alternatively, user device 102 may use information identifying the location of the new virtual point and the information identifying the geographical coordinates of user device 102 to determine the new geographical coordinates of the new virtual point in a manner similar to the manner described above in connection with reference number 112 of FIG. 1A.

As shown in FIG. 1B, and by reference number 122, user device 102 may calculate a new signal strength of the wireless router at the new geographical coordinates and based on the RSSI. User device 102 may calculate the new signal strength of wireless router 104 at the new geographical coordinates of the new virtual point in a manner similar to the manner described above in connection with reference number 114 of FIG. 1A.

For example, user device 102 may calculate a distance between the position of the initial virtual point and the position of the new virtual point. For instance, user device 102 may calculate a distance between the geographical coordinates of the initial virtual point and the new geographical coordinates of the new virtual point. User device 102 may determine the new signal strength of wireless router 104 at the new geographical coordinates based on the distance between the position of the initial virtual point and the position of the new virtual point in a manner similar to the manner described above in connection with reference number 114 of FIG. 1A.

Alternatively, user device 102 may calculate a distance between the current position of user device 102 and the position of the new virtual point. For instance, user device 102 may calculate a distance between the geographical coordinates of the current position of user device 102 and the new geographical coordinates of the new virtual point. User device 102 may determine the new signal strength of wireless router 104 at the new geographical coordinates based on the distance between the current position of user device 102 and the position of the new virtual point in a manner similar to the manner described above in connection with reference number 114 of FIG. 1A.

As shown in FIG. 1B, and by reference number 124, user device 102 may display an AR indication of the new signal strength at the new virtual point. For example, the signal strength application may cause user device 102 to generate a graphical representation of the new signal strength and to augment the camera view (of the camera of user device 102) with the graphical representation of the new signal strength, in a manner similar to the manner described above in connection with reference number 116 of FIG. 1.

In some implementations, user device 102 may display only the graphical representation of the new signal strength. Alternatively, user device 102 may display the graphical representation of the new signal strength with any other graphical representation previously generated by user device 102 (e.g., the graphical representation of the signal strength at the initial virtual location).

As shown in FIG. 1C, assume that user device 102 has determined the signal strength of wireless router 104 at multiple virtual points in the area. Further assume that user device 102 has generated graphical representations of the signal strength at the multiple virtual points (e.g., including the initial virtual point and the new virtual point). As shown in FIG. 1C, user device 102 may display graphical representations of the signal strength (of wireless router 104) at the multiple virtual points.

For example, the signal strength application may cause user device 102 to augment the camera view (of the camera of user device 102) with the graphical representations of the signal strength to provide an AR experience relating to the signal strength in the area in real time (or near real time). User device 102 may provide the graphical representations at respective virtual points in the image. For instance, user device 102 may provide the graphical representation of the signal strength at the initial virtual point, the graphical representation of the new signal strength at the new virtual point, and so on.

In some implementations, user device 102 may provide a graphical representation with information identifying a classification of a corresponding signal strength (e.g., weak, moderate, or strong) and/or information identifying geographical coordinates of a corresponding virtual point. In some example, the geographical coordinates may correspond to geographical coordinates with respect to a point of reference (e.g., user device 102, wireless router 104, etc.).

In some implementations, the signal strength application may cause user device 102 to provide, to the user, an option to display the graphical representations of all the multiple virtual points. Alternatively, the signal strength application may cause user device 102 to provide, to the user, an option to display the graphical representations of a portion of the multiple virtual points. For example, the user (via user device 102) may select one or more of the multiple virtual points. The signal strength application may cause user device 102 to display graphical representations of virtual points based on the option selected by user device 102.

Figure 1D:
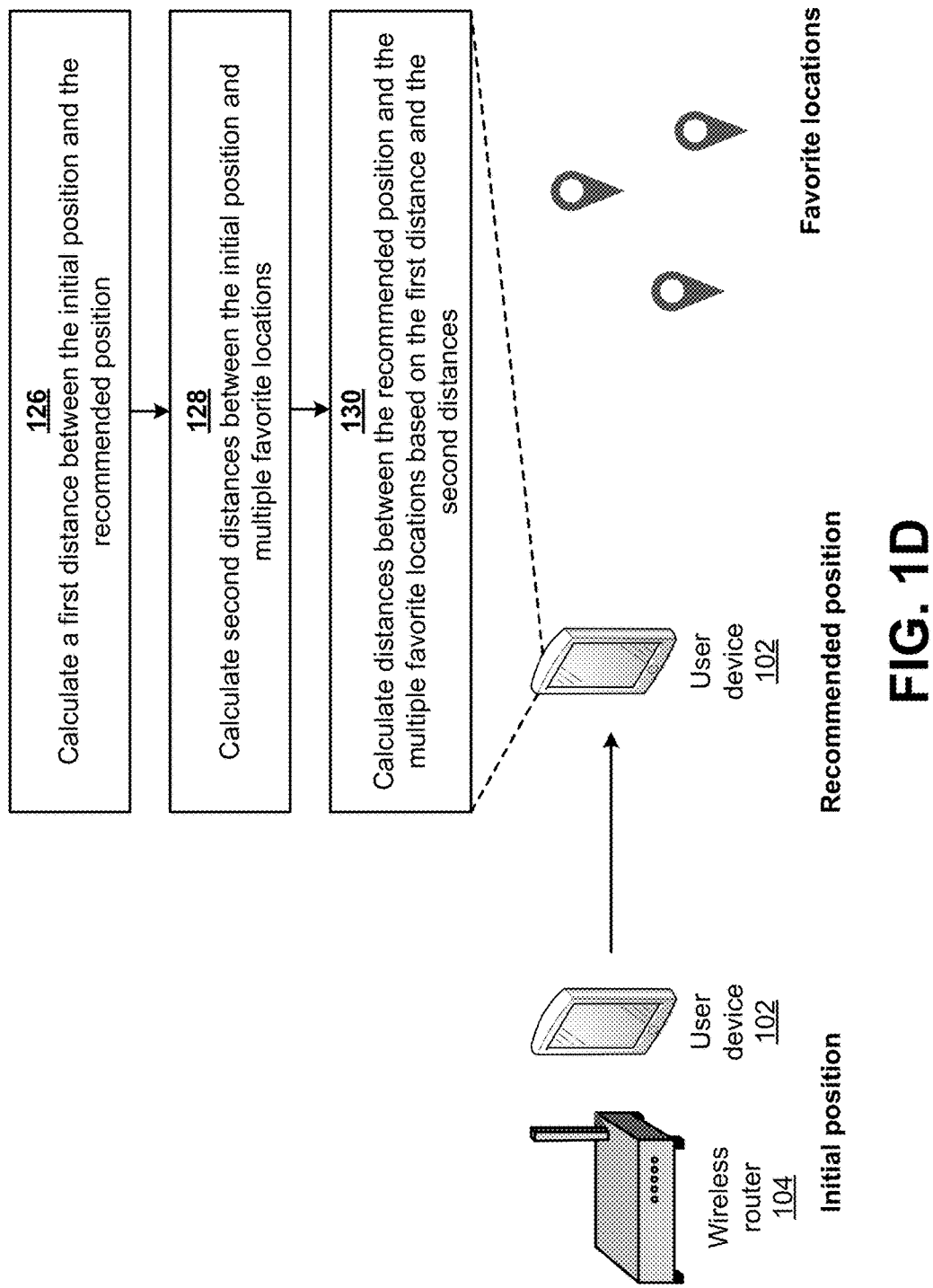

With respect to FIG. 1D, assume that the user desires to determine a new location for wireless router 104 (e.g., a location, in the customer premises, that would provide the best overall coverage for the customer premises). As shown in FIG. 1D, and by reference number 126, user device 102 may calculate a first distance between an initial position of wireless router 104 and a recommended position of wireless router 104. Assume user device 102 has determined the signal strength of wireless router 104 at multiple virtual points, as discussed above in connection with FIG. 1C. In some implementations, user device 102 may determine a recommend position for wireless router 104 based on the signal strength of wireless router 104 at the multiple virtual points. For example, user device 102 may determine the recommended position based on a location of a virtual point associated with a highest signal strength out of the signal strength of wireless router 104 at the multiple virtual points.

Alternatively, user device 102 may determine the recommended position for wireless router 104 based on locations of the multiple virtual points and the signal strength of wireless router 104 at the multiple virtual points. For example, user device 102 may determine a central location with respect to the multiple virtual points. User device 102 may determine the recommended position based on a location of a virtual point that is closest to the central location out of the multiple virtual points and that is associated with a highest signal strength out of the signal strength of wireless router 104 at the multiple virtual points.

Alternatively, user device 102 may receive input, from the user via user device 102, that identifies a particular virtual point (out of the multiple virtual points) as the recommended position.

Based on determining the recommended position, the signal strength application may cause user device 102 to determine the first distance between the initial position of wireless router 104 (e.g., a current position of wireless router 104) and the recommended position. For example, user device 102 may prompt the user to move user device 102 between the initial position of wireless router 104 and the recommended position.

User device 102 may track a distance traveled between the initial position and the recommended position using the one or more sensor devices. In this regard, user device 102 may determine the first distance based on the distance traveled between the initial position and the recommended position. User device 102 may store information identifying the first distance (e.g., in the memory associated with user device 102) and/or information identifying a path traveled (or traversed) between the initial position and the recommended position.

As shown in FIG. 1D, and by reference number 128, user device 102 may calculate second distances between the initial position and multiple favorite locations. For example, the signal strength application may prompt the user to identify multiple favorite locations (e.g., an office, a dinner room, a patio, a basement, and/or another location) of the customer premises. The multiple favorite locations may correspond to locations where the user typically (or frequently) uses user device 102 to access one or more devices and/or an external networks (e.g., the Internet) via wireless router 104.

After the multiple favorite locations have been identified, the signal strength application may cause user device 102 to determine distances between the initial position of wireless router 104 and the multiple favorite locations. In some implementations, user device 102 may prompt the user to move user device 102 between the initial position of wireless router 104 and the multiple favorite locations. User device 102 may determine a distance between the initial position and a first favorite location, a distance between the initial position and a second favorite location, and so on in a manner similar to the manner described above in connection with reference number 126.

User device 102 may store (e.g., in the memory associated with user device 102) information identifying the distance between the initial position and the first favorite location along with information identifying a path traveled between the initial position and the first favorite location, information identifying the distance between the initial position and the second favorite location along with information identifying a path traveled between the initial position and the second favorite location, and so on. Additionally, user device 102 may store directional data associated with the distances discussed above.

As shown in FIG. 1D, and by reference number 130, user device 102 may calculate distances between the recommended position and the multiple favorite locations based on the first distance and the second distances. For example, the signal strength application may cause user device 102 to determine a distance between the recommended position and the first favorite location, a distance between the recommended position and the second favorite location, and so on.

As example, user device 102 may determine the distance between the recommended position and the first favorite location based on the distance between the initial position and the recommendation position and based on the distance between the initial position and the first favorite location. In some implementations, user device 102 may determine the distance between the recommended position and the first favorite location based on the following formula:

$$z_{f1} = x_{f1} + y_{f1} - 2xy \cos(\text{angle}_{xy}),$$

where $z_{f1}$ is the distance between the recommended position and the first favorite location, $x_{f1}$ is the x coordinate of the first favorite location, $y_{f1}$ is the y coordinate of the first favorite location, and $\text{angle}_{xy}$ is an angle between the path between the initial position and the recommended position and the path between the initial position and the second favorite location.

In some implementation, the x and y coordinates of the first favorite location may be determined by user device 102 when user device 102 (and the user) are located at the first favorite location. User device 102 may determine the distance between the recommended position and the second favorite location in a manner similar to the manner described above.

Figure 1E:
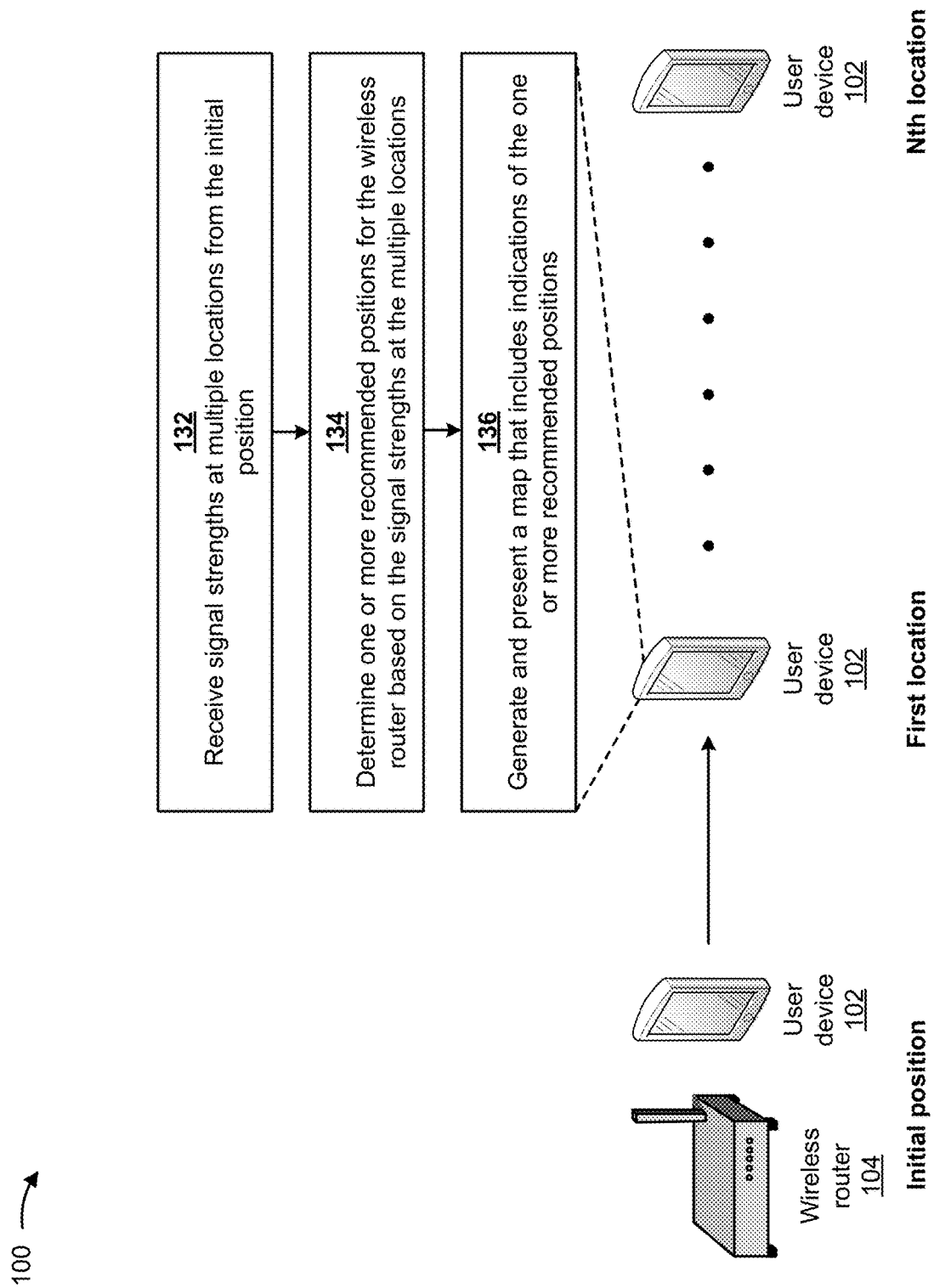

As shown in FIG. 1E, and by reference number 132, user device 102 may receive signal strengths at multiple locations from the initial position. The multiple locations may include one or more of the multiple favorite locations. In this regard, user device 102 may receive a signal from wireless router 104 when user device 102 is located at the first favorite location, determine an RSSI value based on the signal, and determine a signal strength of wireless router 104 at the first favorite location based on the RSSI value.

Similarly, user device 102 may receive a signal from wireless router 104 when user device 102 is located at the second favorite location, determine an RSSI value based on the signal, and determine a signal strength of wireless router 104 at the second favorite location based on the RSSI value, and so on. User device 102 may determine the RSSI value at the multiple locations in manner similar to the manner described above with respect to reference number 108 of FIG. 1A. User device 102 may classify the signal strength of wireless router 104 at the multiple locations in a manner similar to the manner described above in connection with reference number 116 of FIG. 1A.

In some implementations, instead of receiving the signal strength, user device 102 may determine the signal strength of wireless router 104 at the multiple locations based on the distance between wireless router 104 and the multiple locations. For example, when located at the initial position, user device 102 may determine the signal strength of wireless router 104 at the first favorite location based on the distance between the initial position and the first favorite location, in a manner similar to the manner described above with respect to reference number 114 of FIG. 1A. Similarly, when located at the initial position, user device 102 may determine the signal strength of wireless router 104 at the second favorite location based on the distance between the initial position and the second favorite location, in a manner similar to the manner described above with respect to reference number 114 of FIG. 1A.

Alternatively, when located at the recommended position, user device 102 may determine the signal strength of wireless router 104 at the first favorite location based on the distance between the recommended position and the first favorite location, in a manner similar to the manner described above with respect to reference number 114 of FIG. 1A. Similarly, when located at the recommended position, user device 102 may determine the signal strength of wireless router 104 at the second favorite location based on the distance between the recommended position and the second favorite location, in a manner similar to the manner described above with respect to reference number 114 of FIG. 1A.

As shown in FIG. 1E, and by reference number 134, user device 102 may determine one or more recommended positions for the wireless router based on the signal strengths at the multiple locations. In some implementations, user device 102 may determine the one or more recommended positions based on a classification of the signal strength of wireless router 104 at the multiple locations. For example, user device 102 may rank the multiple locations based on the classification of the signal strength of wireless router 104 at the multiple locations. User device 102 may determine the one or more recommended positions based on ranking the multiple positions. For instance, the one or more recommended positions may correspond to one or more locations ranked highest out of the multiple locations.

Additionally, or alternatively, user device 102 may determine a central location with respect to the multiple locations and determine the one or more recommendations based on one or more locations closest to the central location out of the multiple locations. User device 102 may rank the one or more locations based on the classification of the signal strength of wireless router 104 at the one or more locations. User device 102 may determine the one or more recommended positions based on ranking the one or more locations. For instance, the one or more recommended positions may correspond to a location ranked highest out of the one or more locations.

Additionally, or alternatively, user device 102 may provide information identifying the multiple locations and prompt the user to select one or more favorite locations out of the multiple locations. For example, the one or more favorite locations may correspond to locations where user device 102 is used most (out of the multiple locations) to access one or more devices and/or an external networks (e.g., the Internet). User device 102 may determine the one or more recommended positions, out of the one or more favorite locations, in a manner similar to the manner described above (e.g., based on the classification of the signal strength and/or based on the central location).

As shown in FIG. 1E, and by reference number 136, user device 102 may generate and present a map that includes indications of the one or more recommended positions. For example, user device 102 may obtain (e.g., from the memory associated with user device 102), the information identifying the distances between the initial position and the multiple locations, the information identifying the paths traveled between the initial position and the multiple locations, the directional data associated with the distances discussed above, and/or the information identifying the signal strength at the multiple locations.

User device 102 may generate the map based on the information obtained from the memory and provide the map for display. For example, the map may include indication of the paths traveled between the initial position and the multiple locations, indications of the signal strengths at the multiple locations, one or more indications of the one or more recommended positions for wireless router 104.

Figure 1F:
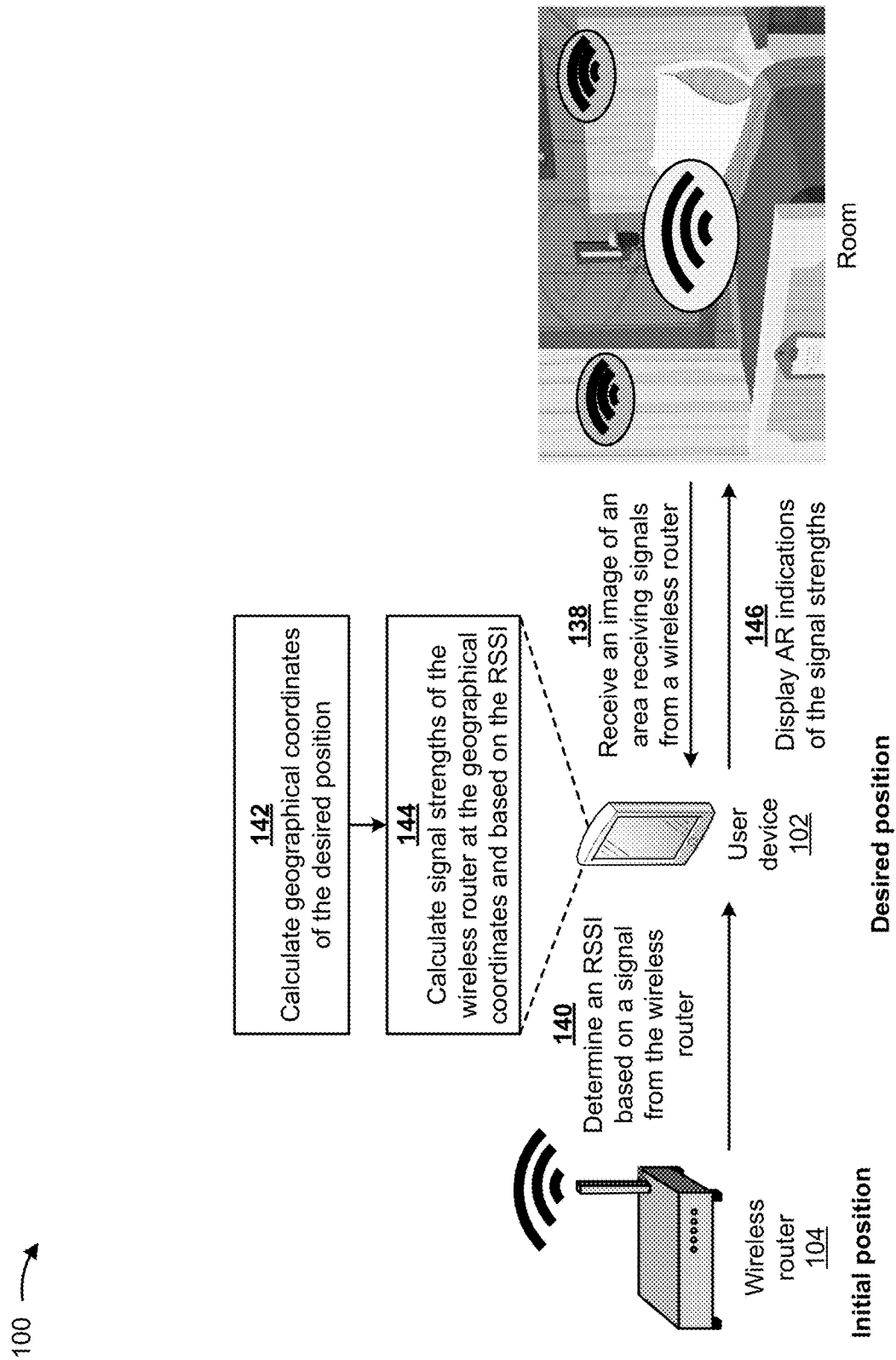

With respect to FIG. 1F, assume that the user desires to relocate wireless router 104 from the initial position to a recommended position out of the one or more recommended positions. Further assume that the recommended position is the area (discussed in FIG. 1A). Further assume that the user desires to relocate wireless router 104 at a desired location (e.g., close to a bed in the bedroom) and desires to know the signal strength of wireless router 104 (when placed at the particular location) at the favorite locations identified in connection with FIG. 1D.

As shown in FIG. 1F, and by reference number 138, user device 102 may receive an image of the area. For example, user device 102 may receive the image of the area in a manner similar to the manner described above in connection with reference number 106 of FIG. 1A.

As shown in FIG. 1F, and by reference number 140, user device 102 may determine an RSSI value based on a signal received from the wireless router. For example, user device 102 may determine the RSSI value based on the signal received from wireless router 104 in a manner similar to the manner described above in connection with reference number 108 of FIG. 1A.

As shown in FIG. 1F, and by reference number 142, user device 102 may calculate geographical coordinates of the desired position. For example, user device 102 may determine the desired position (e.g., the location of the bedroom) in the image in a manner similar to the manner described above in connection with reference number 110 of FIG. 1A. User device 102 may calculate the geographical coordinates of the desired position in a manner similar to the manner described above in connection with reference number 112 of FIG. 1A.

As shown in FIG. 1F, and by reference number 144, user device 102 may calculate signal strengths of the wireless router at the geographical coordinates and based on the RSSI value. For example, assume the user desires to know the signal strength of wireless router 104 (when placed at the particular location—i.e., close to the bed in the bedroom) at the favorite locations identified in connection with FIG. 1D. User device 102 may determine the signal strength of wireless router 104 (when placed at the particular location) at the favorite locations in a manner similar to the manner described above in connection with reference numbers 118, 120, and 122 of FIG. 1B.

For example, user device 102 may determine a distance between the particular location and a first favorite location and may determine the signal strength of wireless router 104 (e.g., when placed at the particular location) at the first favorite location. Similarly, user device 102 may determine a distance between the particular location and a second favorite location and may determine the signal strength of wireless router 104 at the second favorite location, and so on. In some examples, user device 102 may detect a pan movement, of the camera of user device 102, indicating movement toward a favorite location and may determine the signal strength at the favorite location based on detecting the pan movement.

As shown in FIG. 1F, and by reference number 146, user device 102 may display AR indications of the signal strengths. For example, user device 102 may display the AR indications of the signal strength at the multiple locations in a manner similar to the manner described above in connection with reference number 116 of FIG. 1A. Based on the AR indications, the user may determine whether to relocate wireless router 104 to the particular location or to an alternate location in the bedroom.

While the foregoing description has been provided with respect to a wireless router, the present disclosure is applicable to a wireless extender device.

The number and arrangement of devices and networks shown in FIGS. 1A-1F are provided as an example. In practice, there may be additional devices and/or networks, fewer devices and/or networks, different devices and/or networks, or differently arranged devices and/or networks than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) of example implementation 100 may perform one or more functions described as being performed by another set of devices of example implementation 100.

Figure 2:
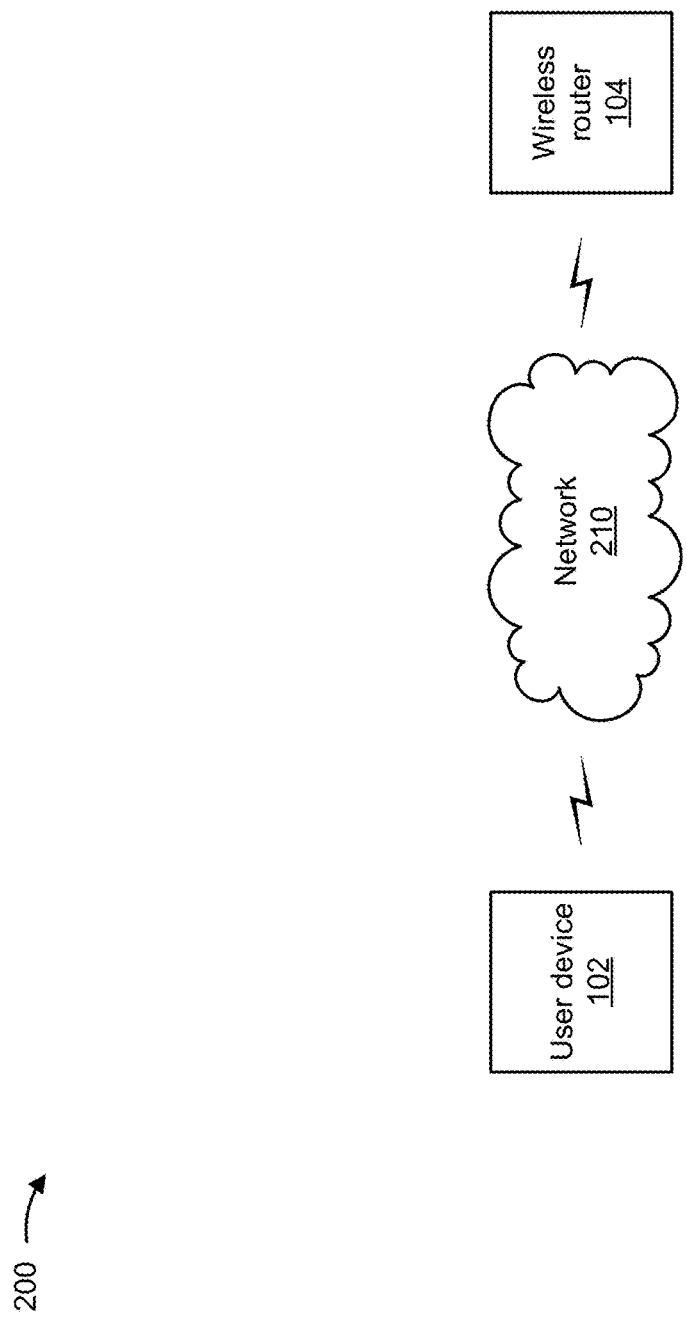
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include user device 102, wireless router 104, and network 210.

User device 102 includes one or more devices capable of receiving, generating, storing, processing, and/or providing information associated with dynamically estimating real time signal strengths for a wireless router using augmented reality, as described elsewhere herein. User device 102 may include a communication device and/or a computing device. For example, user device 102 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), or a similar type of device. User device 102 may communicate with one or more other devices of environment 200, as described elsewhere herein.

Wireless router 104 includes one or more devices capable of receiving, generating, storing, processing, and/or providing information associated with dynamically estimating real time signal strengths for a wireless router using augmented reality, as described elsewhere herein. Wireless router 104 may include a wireless network extender, a wireless gateway, a wireless switch, a wireless firewall, a wireless hub, wireless modem, or a similar type of device. Wireless router 104 may communicate with one or more other devices of environment 200, as described elsewhere herein.

Network 210 includes one or more wired and/or wireless networks. For example, the network 210 may include a local area network (LAN), a wide area network (WAN), a private network, an ad hoc network, an intranet, the Internet, a fiber optic-based network, and/or a combination of these or other types of networks. The network 210 enables communication among the devices of environment 200.

Figure 3:
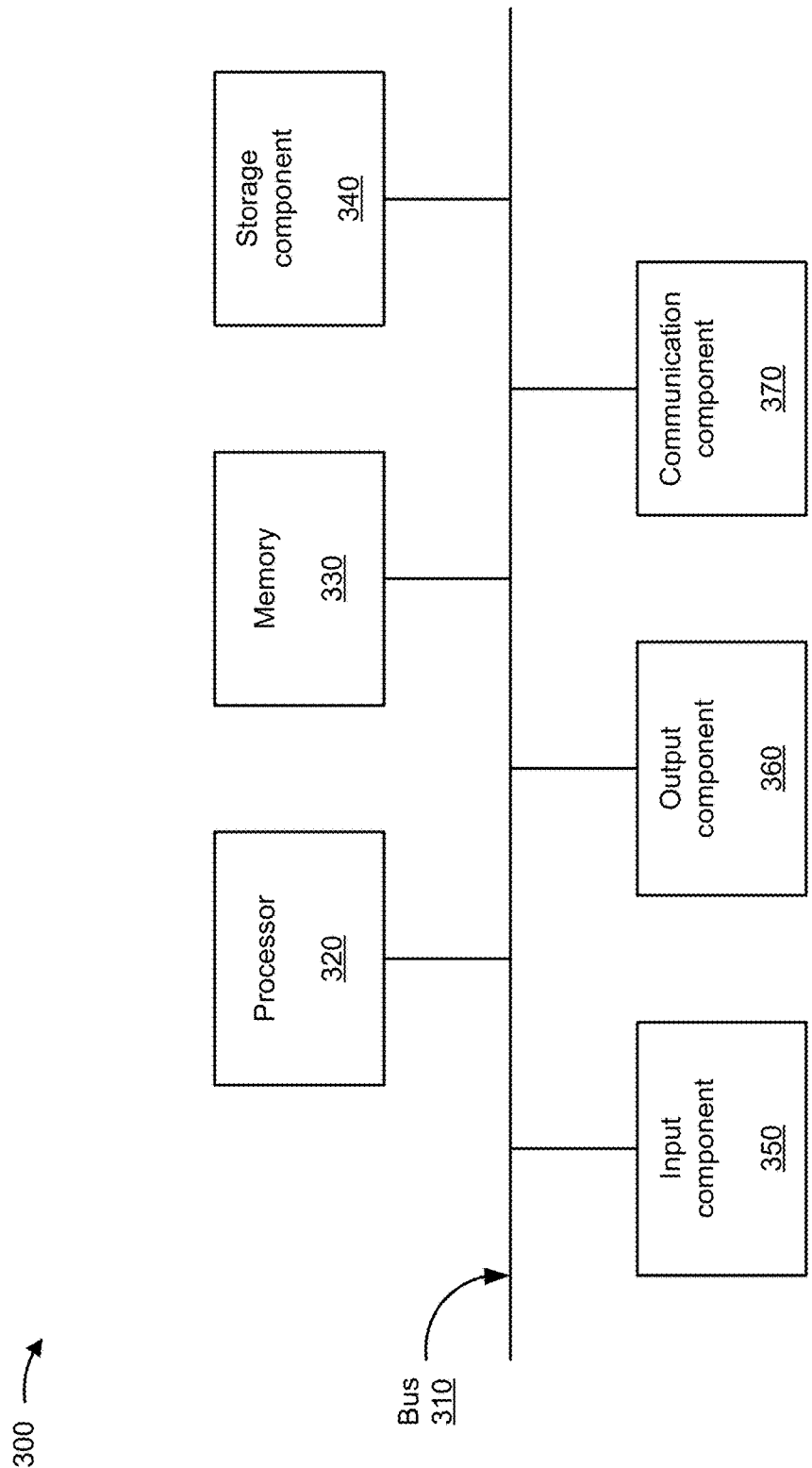
FIG. 3 is a diagram of example components of one or more devices of FIG. 2.

FIG. 3 is a diagram of example components of a device 300, which may correspond to user device 102 and/or wireless router 104. In some implementations, user device 102 and/or wireless router 104 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, an actuator, and/or the like. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, an antenna, and/or the like.

Device 300 may perform one or more processes described herein. For example, a non-transitory computer-readable medium (e.g., memory 330 and/or storage component 340) may store a set of instructions (e.g., one or more instructions, code, software code, program code, and/or the like) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
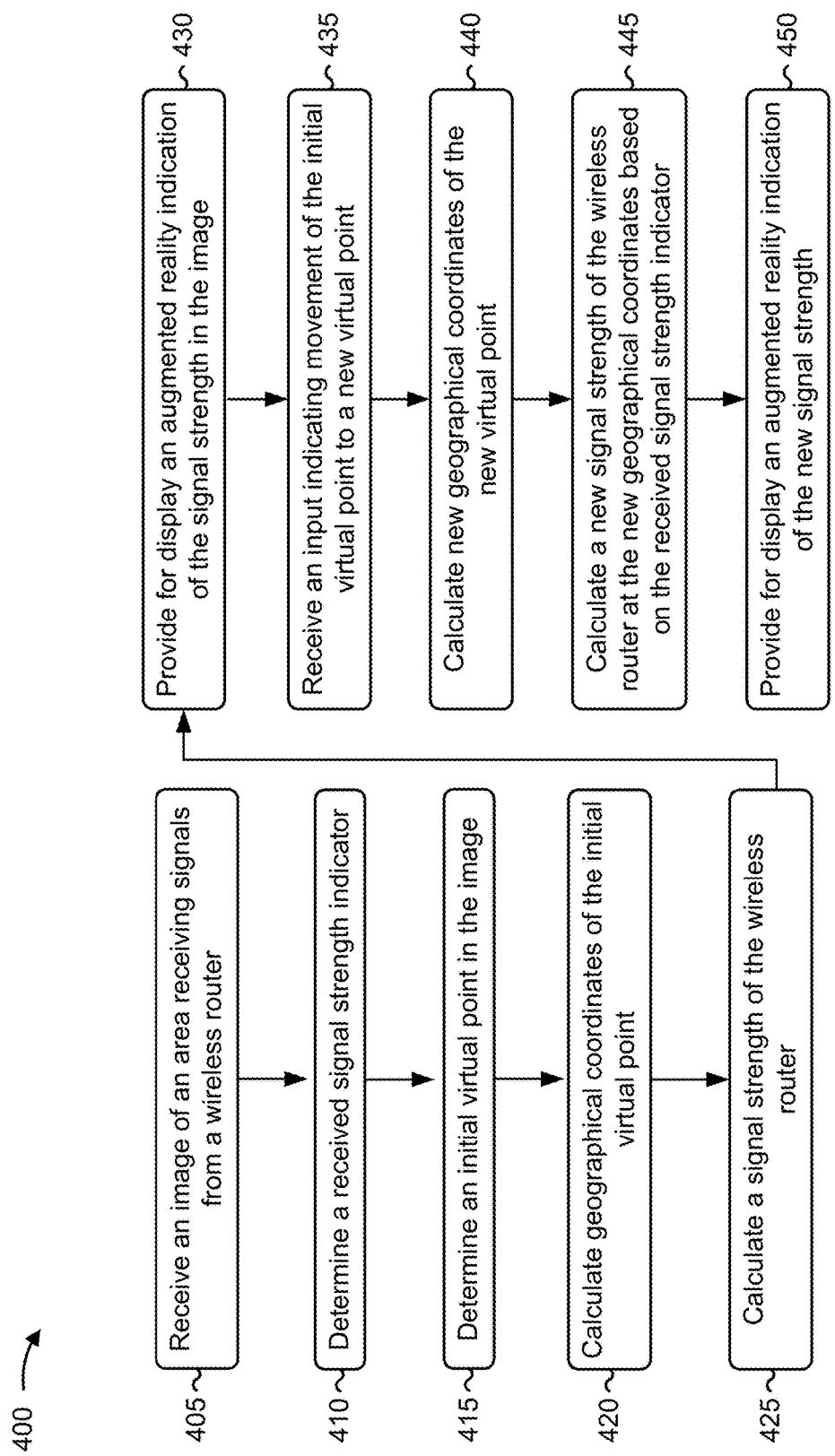
FIG. 4 is a flowchart of an example process associated with dynamically estimating real time signal strengths for a wireless router using augmented reality.

FIG. 4 is a flowchart of an example process 400 associated with systems and methods for dynamically estimating real time signal strengths for a wireless router using augmented reality. In some implementations, one or more process blocks of FIG. 4 may be performed by a user device (e.g., user device 102). In some implementations, one or more process blocks of FIG. 4 may be performed by another device or a group of devices separate from or including the user device, such as a wireless router (e.g., wireless router 104). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving an image of an area receiving signals from a wireless router (block 405). For example, the user device may receive an image of an area receiving signals from a wireless router, as described above.

As further shown in FIG. 4, process 400 may include determining a received signal strength indicator based on a signal received from the wireless router (block 410). For example, the user device may determine a received signal strength indicator based on a signal from the wireless router, as described above.

As further shown in FIG. 4, process 400 may include determining an initial virtual point in the image (block 415). For example, the user device may determine an initial virtual point in the image, as described above.

As further shown in FIG. 4, process 400 may include calculating geographical coordinates of the initial virtual point based on a current position of the user device (block 420). For example, the user device may calculate geographical coordinates of the initial virtual point based on a current position of the user device, as described above.

As further shown in FIG. 4, process 400 may include calculating a signal strength of the wireless router at the geographical coordinates and based on the received signal strength indicator (block 425). For example, the user device may calculate a signal strength of the wireless router at the geographical coordinates and based on the received signal strength indicator, as described above.

As further shown in FIG. 4, process 400 may include providing for display an augmented reality indication of the signal strength in the image and at the initial virtual point (block 430). For example, the user device may provide for display an augmented reality indication of the signal strength in the image and at the initial virtual point, as described above.

As further shown in FIG. 4, process 400 may include receiving an input indicating movement of the initial virtual point to a new virtual point in the image (block 435). For example, the user device may receive an input indicating movement of the initial virtual point to a new virtual point in the image, as described above.

In some implementations, receiving the input indicating movement of the initial virtual point to the new virtual point in the image comprises receiving a pan movement, of a camera of the user device, indicating movement of the initial virtual point to the new virtual point in the image.

As further shown in FIG. 4, process 400 may include calculating new geographical coordinates of the new virtual point (block 440). For example, the user device may calculate new geographical coordinates of the new virtual point, as described above.

As further shown in FIG. 4, process 400 may include calculating a new signal strength of the wireless router at the new geographical coordinates and based on the received signal strength indicator (block 445). For example, the user device may calculate a new signal strength of the wireless router at the new geographical coordinates and based on the received signal strength indicator, as described above.

In some implementations, calculating the new signal strength of the wireless router at the new geographical coordinates and based on the received signal strength indicator comprises calculating a distance between the geographical coordinates and the new geographical coordinates, and calculating the new signal strength of the wireless router based on the received signal strength indicator and based on the distance between the geographical coordinates and the new geographical coordinates.

As further shown in FIG. 4, process 400 may include providing for display an augmented reality indication of the new signal strength in the image and at the new virtual point (block 450). For example, the user device may provide for display an augmented reality indication of the new signal strength in the image and at the new virtual point, as described above.

In some implementations, process 400 includes receiving multiple inputs indicating multiple movements of the initial virtual point to multiple new virtual points in the image, calculating multiple new geographical coordinates of the multiple new virtual points, calculating multiple new signal strengths of the wireless router at the multiple new geographical coordinates and based on the received signal strength indicator, and providing for display multiple augmented reality indications of the multiple new signal strengths in the image and at the multiple new virtual points.

In some implementations, process 400 includes classifying the new signal strength of the wireless router based on signal strength thresholds, and generating the augmented reality indication of the new signal strength based on classifying the new signal strength.

In some implementations, classifying the new signal strength of the wireless router based on the signal strength thresholds comprises classifying the new signal strength of the wireless router as weak, moderate, or strong, based on signal strength thresholds.

In some implementations, process 400 includes determining a recommended position for the wireless router based on the new signal strength, calculating a first distance between an initial position of the wireless router and the recommended position, calculating second distances between the initial position of the wireless router and multiple favorite locations, calculating distances between the recommended position and the multiple favorite locations based on the first distance and the second distances, providing, for display, the recommended position for the wireless router, and providing the distances to the wireless router.

In some implementations, process 400 includes receiving signal strengths at multiple locations from a position of the wireless router; determining a recommended position for a wireless extender device based on the signal strengths at the multiple locations; generating a map that includes an indication of the recommended position; and providing the map for display.

In some implementations, process 400 includes calculating particular geographical coordinates of a desired position of the wireless router; calculating particular signal strengths of the wireless router at the particular geographical coordinates and based on the received signal strength indicator; and providing for display augmented reality indications of the particular signal strengths in the image.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:
   receiving, by a user device, an image of an area receiving signals from a wireless router;
   determining, by the user device, a received signal strength indicator based on a signal from the wireless router;
   determining, by the user device, an initial virtual point in the image;
   calculating, by the user device, geographical coordinates of the initial virtual point based on a current position of the user device;
   calculating, by the user device, a signal strength of the wireless router at the geographical coordinates and based on the received signal strength indicator;
   providing for display, by the user device, an augmented reality indication of the signal strength in the image and at the initial virtual point;
   receiving, by the user device, an input indicating movement of the initial virtual point to a new virtual point in the image;
   calculating, by the user device, new geographical coordinates of the new virtual point;
   calculating, by the user device and without physically moving the wireless router, a new signal strength of the wireless router at the new geographical coordinates and based on the received signal strength indicator; and
   providing for display, by the user device, an augmented reality indication of the new signal strength in the image and at the new virtual point.

2. The method of claim 1, wherein receiving the input indicating movement of the initial virtual point to the new virtual point in the image comprises:
   receiving a pan movement, of a camera of the user device, indicating movement of the initial virtual point to the new virtual point in the image.

3. The method of claim 1, further comprising:
   receiving multiple inputs indicating multiple movements of the initial virtual point to multiple new virtual points in the image;
   calculating multiple new geographical coordinates of the multiple new virtual points;
   calculating multiple new signal strengths of the wireless router at the multiple new geographical coordinates and based on the received signal strength indicator; and
   providing for display multiple augmented reality indications of the multiple new signal strengths in the image and at the multiple new virtual points.

4. The method of claim 1, wherein calculating the new signal strength of the wireless router at the new geographical coordinates and based on the received signal strength indicator comprises:
   calculating a distance between the geographical coordinates and the new geographical coordinates; and
   calculating the new signal strength of the wireless router based on the received signal strength indicator and based on the distance between the geographical coordinates and the new geographical coordinates.

5. The method of claim 1, further comprising:
   classifying the new signal strength of the wireless router based on signal strength thresholds; and
   generating the augmented reality indication of the new signal strength based on classifying the new signal strength.

6. The method of claim 5, wherein classifying the new signal strength of the wireless router based on the signal strength thresholds comprises:
   classifying the new signal strength of the wireless router as weak, moderate, or strong, based on signal strength thresholds.

7. The method of claim 1, further comprising:
   determining a recommended position for the wireless router based on the new signal strength;
   calculating a first distance between an initial position of the wireless router and the recommended position;
   calculating second distances between the initial position of the wireless router and multiple favorite locations;
   calculating distances between the recommended position and the multiple favorite locations based on the first distance and the second distances;
   providing, for display, the recommended position for the wireless router; and
   providing the distances to the wireless router.

8. A user device, comprising:
   one or more processors configured to:
     receive an image of an area receiving signals from a wireless router;
     determine a received signal strength indicator based on a signal from the wireless router;
     determine an initial virtual point in the image;
     calculate geographical coordinates of the initial virtual point based on a current position of the user device;

calculate a signal strength of the wireless router at the geographical coordinates and based on the received signal strength indicator;
provide for display an augmented reality indication of the signal strength in the image and at the initial virtual point;
receive an input indicating movement of the initial virtual point to a new virtual point in the image;
calculate new geographical coordinates of the new virtual point;
calculate, without physically moving the wireless router, a new signal strength of the wireless router at the new geographical coordinates and based on the received signal strength indicator;
classify the new signal strength of the wireless router based on signal strength thresholds;
generate an augmented reality indication of the new signal strength based on classifying the new signal strength; and
provide for display the augmented reality indication of the new signal strength in the image and at the new virtual point.

9. The user device of claim 8, wherein the one or more processors are further configured to:
receive signal strengths at multiple locations from an initial position of the wireless router;
determine one or more recommended positions for the wireless router based on the signal strengths at the multiple locations;
generate a map that includes indications of the one or more recommended positions; and
provide the map for display.

10. The user device of claim 8, wherein the one or more processors are further configured to:
calculate particular geographical coordinates of a desired position of the wireless router;
calculate particular signal strengths of the wireless router at the particular geographical coordinates and based on the received signal strength indicator; and
provide for display augmented reality indications of the particular signal strengths in the image.

11. The user device of claim 8, wherein the one or more processors are further configured to:
receive signal strengths at multiple locations from a position of the wireless router;
determine a recommended position for a wireless extender device based on the signal strengths at the multiple locations;
generate a map that includes an indication of the recommended position; and
provide the map for display.

12. The user device of claim 8, wherein the one or more processors are further configured to:
receive signal strengths at multiple locations from a position of the wireless router;
determine a path traversed between the multiple locations;
generate a map that includes an indication of the path and indications of the signal strengths at the multiple locations; and
provide the map for display.

13. The user device of claim 12, wherein the one or more processors, when determining the path, are configured to:
receive distances traveled between the multiple locations;
receive directional data associated with the distances; and
determine the path traversed between the multiple locations based on the distances and the directional data.

14. The user device of claim 8, wherein the one or more processors are further configured to:
determine a recommended position for the wireless router based on the new signal strength; and
provide, for display, the recommended position for the wireless router.

15. A non-transitory computer-readable medium storing a set of instructions, the set of instructions comprising:
one or more instructions that, when executed by one or more processors of a user device, cause the user device to:
receive an image of an area receiving signals from a wireless router;
determine a received signal strength indicator based on a signal from the wireless router;
determine an initial virtual point in the image;
calculate geographical coordinates of the initial virtual point based on a current position of the user device;
calculate a signal strength of the wireless router at the geographical coordinates and based on the received signal strength indicator;
provide for display an augmented reality indication of the signal strength in the image and at the initial virtual point;
receive multiple inputs indicating multiple movements of the initial virtual point to multiple new virtual points in the image;
calculate multiple new geographical coordinates of the multiple new virtual points;
calculate, without physically moving the wireless router, multiple new signal strengths of the wireless router at the multiple new geographical coordinates and based on the received signal strength indicator; and
provide for display multiple augmented reality indications of the multiple new signal strengths in the image and at the multiple new virtual points.

16. The non-transitory computer-readable medium of claim 15, wherein the one or more instructions further cause the user device to:
classify the multiple new signal strengths of the wireless router based on signal strength thresholds; and
generate the multiple augmented reality indications of the multiple new signal strengths based on classifying the multiple new signal strengths.

17. The non-transitory computer-readable medium of claim 15, wherein the one or more instructions further cause the user device to:
determine a recommended position for the wireless router based on the multiple new signal strengths;
calculate a first distance between an initial position of the wireless router and the recommended position;
calculate second distances between the initial position of the wireless router and multiple favorite locations;
calculate distances between the recommended position and the multiple favorite locations based on the first distance and the second distances; and
provide the distances to the wireless router.

18. The non-transitory computer-readable medium of claim 15, wherein the one or more instructions further cause the user device to:
receive signal strengths at multiple locations from an initial position of the wireless router;
determine one or more recommended positions for the wireless router based on the signal strengths at the multiple locations;

generate a map that includes indications of the one or more recommended positions; and provide the map for display.

19. The non-transitory computer-readable medium of claim 15, wherein the one or more instructions further cause the user device to:

calculate particular geographical coordinates of a desired position of the wireless router;

calculate particular signal strengths of the wireless router at the particular geographical coordinates and based on the received signal strength indicator; and provide for display augmented reality indications of the particular signal strengths in the image.

20. The non-transitory computer-readable medium of claim 15, wherein the one or more instructions further cause the user device to:

receive signal strengths at multiple locations from a position of the wireless router;

determine a path traversed between the multiple locations;

generate a map that includes an indication of the path and indications of the signal strengths at the multiple locations; and provide the map for display.

\* \* \* \* \*